United States Patent
Habiby et al.

(10) Patent No.: US 7,346,076 B1
(45) Date of Patent: Mar. 18, 2008

(54) NETWORK CONTROLLER AND METHOD TO SUPPORT FORMAT NEGOTIATION BETWEEN INTERFACES OF A NETWORK

(75) Inventors: Samer A. Habiby, Holmdel, NJ (US); Steven M. Michelson, Freehold, NJ (US)

(73) Assignee: AT&T Corp., New York, NY (US)

( * ) Notice: Subject to any disclaimer, the term of this patent is extended or adjusted under 35 U.S.C. 154(b) by 1001 days.

(21) Appl. No.: 10/140,518

(22) Filed: May 7, 2002

(51) Int. Cl.
- H04J 3/16 (2006.01)
- H04J 3/22 (2006.01)
- H04L 12/66 (2006.01)
- H04B 1/00 (2006.01)
- H04B 7/00 (2006.01)
- H04Q 7/20 (2006.01)

(52) U.S. Cl. ........................ 370/466; 370/352; 455/68; 455/422.1

(58) Field of Classification Search ................ 370/466, 370/352, 401–406, 522, 331, 461, 349, 288, 370/338, 395, 398, 260, 250; 455/68, 422.1, 455/436, 560, 442, 417, 414; 705/39; 375/240.16, 375/240.24, 240.01, 240.12; 379/207, 88.17; 709/227

See application file for complete search history.

(56) References Cited

U.S. PATENT DOCUMENTS 6,490,451 B1* 12/2002 Denman et al. ............ 455/436

2002/0154646 A1* 10/2002 Dubois et al. .............. 370/406
2002/0176404 A1* 11/2002 Girard ........................ 370/352
2003/0227908 A1* 12/2003 Scoggins et al. ........... 370/352
2004/0240469 A1* 12/2004 Stumpert et al. ........... 370/466

OTHER PUBLICATIONS

Taylor, T.; Megaco/H.248: a new standard for media gateway control; Oct. 2000, Communications Magazine, IEEEvol. 38, Issue 10, pp. 124-132.*
Kish et al, One Vendors Softswitch is Another's Media Gateway, Gartner, Inc., Apr. 2, 2002, pp. 1-29.*

* cited by examiner

*Primary Examiner*—Wing Chan
*Assistant Examiner*—Prenell Jones

(57) ABSTRACT

A controller of a communications network enables endpoints or multiple networks to intercommunicate using multiple types of bearer format (IP, TDM, ATM, Frame Relay, etc.), and enables a bearer format conversion when necessary to carry bearer channel information across an interface of the network. The network may be packet-based or circuit-based and may include gateways and associated controllers which work in tandem to transfer format conversion parameters between endpoints or networks. The format control parameters are exchanged between various controllers, i.e., call control elements, to determine the appropriate format to forward the bearer channel information across the interface and to instruct the associated gateway of the required format conversion. The determination of the necessary format conversions may occur on a call-by-call basis, or by periodically detecting and storing format conversions associated with the various endpoints and intercommunicating networks. A corresponding method is also disclosed.

10 Claims, 1 Drawing Sheet

US 7,346,076 B1

NETWORK CONTROLLER AND METHOD TO SUPPORT FORMAT NEGOTIATION BETWEEN INTERFACES OF A NETWORK

BACKGROUND OF THE INVENTION

This invention relates to communication networks, but more specifically to a network controller and method that enables bearer format negotiation between interfaces of the network in order to facilitate communications between endpoints that support different transmission protocols.

Data transfers occur over channels of communication networks under various transmission protocols, either circuit-based or packet-based. An example of a circuit-based transmission protocol is Time Division Multiplex (TDM). In a TDM protocol, a data stream is conveyed over a physical carrier at a constant bit rate with appropriate framing bits to enable synchronized detection of data. Packet-based transmission protocols, on the other hand, include Internet Protocol (IP) and Asynchronous Transfer Mode (ATM). ATM provides connection-oriented transport of data in fixed-length 53-byte cells while IP provides connectionless transport of data in variable length packets. Either protocol may be used to transport a bearer channel for multimedia, voice, video, or other real-time traffic.

A problem occurs when the bearer channel is passed between networks, or between endpoints and networks, that use different transmission protocols. If an originating endpoint or node connects to a network via an IP interface, and the network uses ATM in its backbone, and the terminating endpoint or node connects to the network via a TDM interface, then conversions must take place between the different transmission protocol types in order for the endpoints to communicate with one another. Further, when one network using one bearer format connects to another network using another bearer format, any communication channel passing between the networks must encounter a conversion between bearer formats.

There are numerous ways to handle this situation. One way involves providing parallel backbone networks for each type of transmission protocol, as well as gateways between the parallel networks to allow endpoints on different networks to intercommunicate. Each parallel network need only have a compatible interface to the other networks and endpoints that use the same bearer format. For example, multiple IP networks can easily interface to other networks and endpoints using IP as their bearer format. A gateway, on the other hand, may be required to interconnect, for example, an ATM-based network and a TDM-based network. Interconnecting incompatible networks via a gateway, while workable, has serious disadvantages. First, it is capital intensive, since multiple network types are deployed. Second, it is operationally complex since each network must be administered independently from one another.

In view of the foregoing, an objective of the present invention is to provide a network controller and method thereof that permit network access via multiple bearer formats.

It is another objective to enable a single-protocol network, such as ATM, that interconnects with networks or nodes that use other transmission protocols.

Another objective of the present invention is to provide a method of format conversion that enables end-users to choose a format that is most appropriate for their needs and equipment capabilities.

It is yet a further objective of the present invention to enable a network to lessen loads on network resources (e.g., reduced processing power, terminations, operations processes, etc.) while performing the required functions.

SUMMARY OF THE INVENTION

In accordance with a first aspect of the invention, a communication network using one type of network transmission protocol transports data between and/or among respective nodes that may implement different packet-based or circuit-based transmission protocols, such as ATM, IP, or TDM. In combination with a network that includes plural intercommunicating nodes capable of transferring information according to one of several bearer formats, the first aspect of the invention comprises a controller that exchanges information with an associated node to determine, based on an exchange of control information with at least one other controller, a conversion required between the network transmission protocol and a bearer format of the associated node so that a gateway connected to the associated node may be instructed to perform the determined format conversion.

In another aspect of the invention, a method of providing format conversion between an originating and a terminating node of a network comprises transferring between controllers associated with the originating and terminating nodes signaling information indicative of first and second format control parameters respectively associated with the originating and terminating nodes; in response to the first format control parameter, converting when necessary the first bearer format to a format compatible with the network to enable the originating node to communicate with the network; and, in response to the second format control parameter, converting when necessary the network protocol to a protocol compatible with the second bearer format to enable the terminating node to communicate with the network.

Other features and aspects of the invention will become apparent upon review of the following description taken in connection with the accompanying drawing. The invention, though, is pointed out with particularity by the appended claims.

DESCRIPTION OF ILLUSTRATIVE EMBODIMENTS

Figure 1:
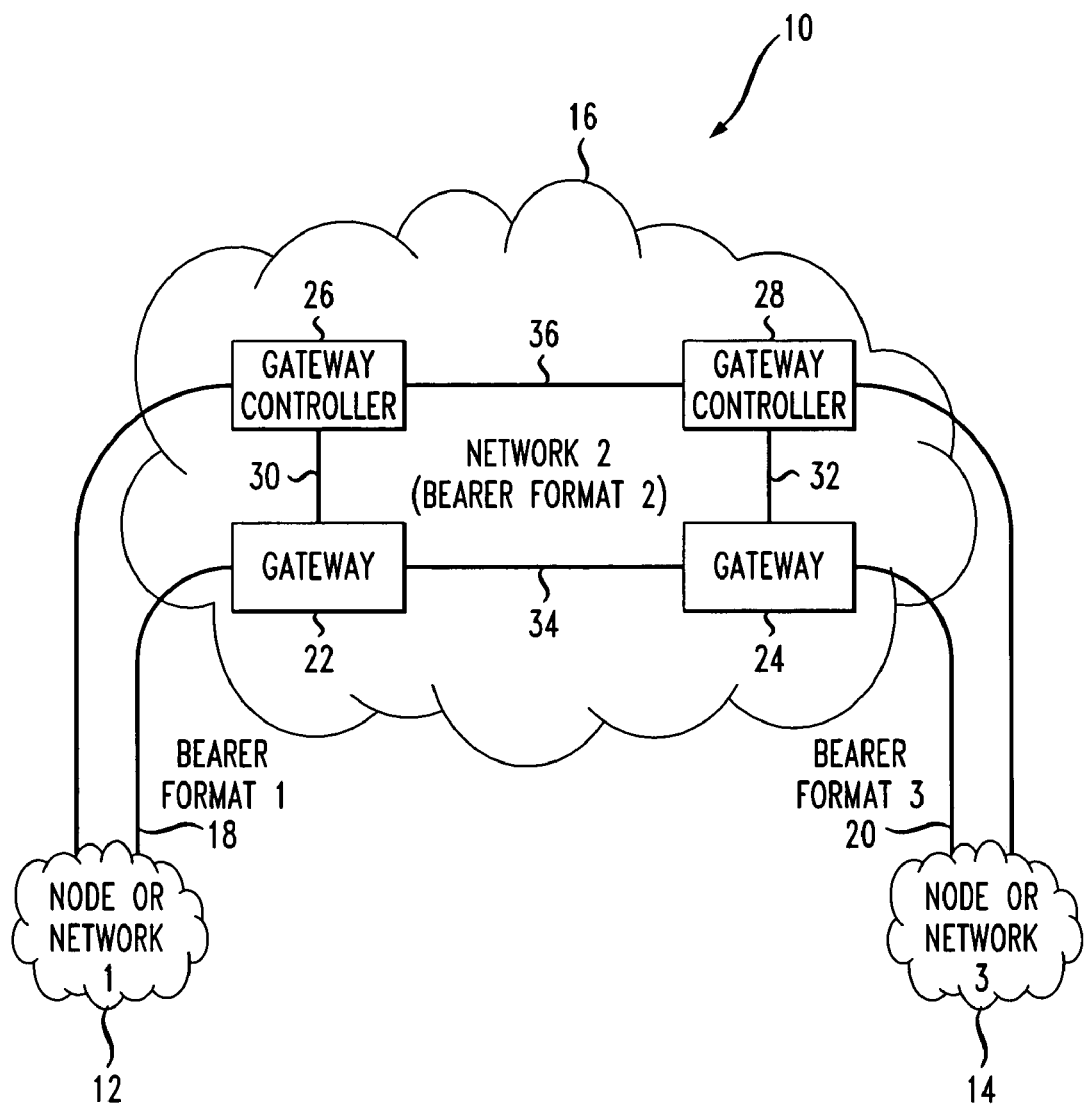
FIG. 1 shows a functional diagram of a multiprotocol network that includes a controller according to an aspect of the present invention.

FIG. 1 shows a multi-protocol backbone network 10 that interfaces with multiple network types or endpoints 12, 14 (hereafter nodes 12, 14) to efficiently transport bearer traffic over a communication channel between nodes. A packet-based backbone network 16, such as an IP or ATM network, is illustrated for purposes of this disclosure. For maximum efficiency and performance, network 16 is optimized for a dominant network protocol of ingress and egress traffic conveyed with nodes 12, 14. For example, if most of the nodes connect to the backbone network 16 via an ATM Adaptation Layer 1 interface, then network 16 is optimized for ATM transport.

To efficiently determine which, if any, bearer format conversion must occur for a particular communication channel over paths 18, 20, the gateway controllers 26, 28 determine the bearer format used at each of the nodes. If, for example, an originating node 12 uses an IP protocol and terminating node 14 uses a TDM protocol, then a conversion is performed between IP and TDM somewhere along the communication path. If the originating and terminating nodes use the same bearer format as that used by the backbone network 16, then no conversion is required or performed.

In order for the gateway controllers to determine whether a conversion is to be performed, bearer format signaling procedures are performed at gateway controllers 26, 28, and signaling messages, including respective bearer format parameters associated with the endpoints, are exchanged among controllers 26, 28, and between controllers 26, 28 and respective nodes 12,14. The signaling procedures and message exchanges allow internodal transfer of the type of bearer format used along every path in a particular communication channel between nodes, and also enable a microprocessor in the gateway controller to determine whether to activate a conversion function of the gateway which it controls. Each gateway may have the functionality to support multiple, i.e., two or more transmission protocols stored therein. The conversion function of the gateway is ready to be activated in response to commands from a respective controller 26, 28 that include the format conversion parameter. Upon initiation of a call, the controller 26, 28 determines the needed conversion based on a memory map of bearer format requirements for the respective nodes that have previously been propagated throughout the network 16 in conjunction with determined knowledge of the user's equipment linked with a node 12, 14. The knowledge of the user's equipment may be determined either by information previously propagated throughout the network 16, or via call setup signaling messages received from the user's equipment at call setup time.

FIG. 1 also illustrates an architecture to support bearer format negotiation. The architecture includes an ingress gateway 22, an egress gateway 24, and one or more gateway controllers 26, 28. Gateways perform bearer format conversion, enabling a call to pass between networks using different internal bearer formats. In the simplest sense, the gateway may also perform a null format conversion. The gateway further includes an interface that allows a gateway controller to instruct which, if any, conversion is needed on a call-by-call or per-connection basis where routines for the various transmission protocol definitions and manner of conversions are stored in a memory associated with the gateway. A gateway controller is one of many types of call control elements having a signaling interface to communicate with other call control elements, as well as a control interface to communicate with the gateways which it controls. As used herein, a call control element is generally a stored program control device that contains logic used to control the setup, tear down, and services for a call.

Signaling interfaces are provided between ingress gateway controller 26 and originating node 12; between egress gateway controller 28 and terminating node 14; and between ingress and egress gateway controllers 26, 28. Paths 30, 32 support respective control interfaces between gateway controllers 26, 28 and their respective gateways 22, 24. In addition, path 18 supports a bearer channel interface between ingress gateway 22 and originating node 12; path 20 supports a bearer channel between egress gateway 24 and terminating node 14; path 34 supports a bearer channel between ingress and egress gateways 22, 24; path 36 supports a signaling channel between controllers 26, 28. The format of the bearer traffic between ingress gateway 22 and originating node 12 comprises bearer format 1; the format of the bearer traffic between ingress and egress gateways 22, 24 comprises bearer format 2; and the format of the bearer channel between egress gateway 24 and terminating node 14 comprises bearer format 3.

To provide efficiency in transport of ATM traffic, for example, there may be provided four types of gateways for each of the gateways 22, 24. In a preferred embodiment that uses an ATM-based backbone network, each gateway 22, 24 provides a bearer interworking function between ATM and various bearer format types. Other backbone networks could also be used, such as an IP-based backbone network having comparable gateways suitable for that type of network. For purposes of this disclosure, exemplary gateways include:

a. AAL1/ATM gateway—a gateway that enables an ATM AAL1-based originating or terminating node to interface with an ATM-based backbone network;

b. AAL2/ATM gateway—a gateway that enables an ATM AAL2-based originating or terminating node to interface with an ATM-based backbone network;

c. IP/ATM gateway—a gateway that enables an IP-based originating or terminating node to interface with an ATM-based backbone network; and d. TDM/ATM gateway—a gateway that enables a TDM-based originating or terminating node to interface with an ATM-based backbone network.

Although four conversion functions are described, the gateways may perform any number of conversions, e.g. two or more. Further, the arrangement depicted in FIG. 1 may be physical or logical. If it is logical, then the functionality of multiple elements may be combined together and performed in a single physical element. For example, a gateway controller and gateway may be combined into a single unit. Similarly, a single gateway controller may have the combined functionality of an originating and terminating gateway controller for a particular call. It is also important to note that a gateway controller and a gateway may perform "ingress functions" for some calls concurrently with "egress functions" for other calls.

To assist in determining how to adapt bearer traffic of potentially different formats, bearer format information is propagated throughout network 16, by gateway controllers 26, 28. Bearer format information identifies the formats used by the respective nodes 12, 14 and is conveyed from an originating or terminating gateway controller, such as controller 26, to another originating or terminating gateway controller, such as controller 28, by way of a parameter in, for example, a call setup message. The parameter is referred to as the bearer format parameter, which identifies the type of interface used between the network 16 and each of the originating and terminating nodes 12, 14. Controllers 26, 28 may determine the bearer format used at nodes 12, 14 via a parameter in a call setup message between nodes 12, 14 and controllers 26, 28 respectively. Alternatively, bearer format information may be stored a priori in a memory associated with the gateway controllers for subsequent access and retrieval. Bearer format information is communicated between the involved gateway controllers on a call-by-call basis and then interpreted by the ingress or egress gateway controller, during call setup between the respective nodes.

The illustrated embodiment uses an ATM backbone network and messages associated with a Bearer Independent Call Control (BICC) signaling protocol. However, different backbone transmission protocols (e.g., IP) with their associated signaling protocols (e.g., SIP) may also be used. The basic premise of passing bearer format information between the ingress and egress sides of a connection or interface on a backbone network in order to determine the appropriate format of data transport remains the same.

Exemplary bearer formats carried over an ATM backbone are shown in Table 1 below.

TABLE 1

| Egress Format | Ingress Format | | | |
|---|---|---|---|---|
| | AAL1 | IP | TDM | AAL2 |
| AAL1 | AAL1 | AAL1 | AAL1 | AAL1 |
| IP | AAL1 | IP over AAL5 | IP over AAL5 | AAL2 |
| TDM | AAL1 | IP over AAL5 | AAL1 | AAL1 |
| AAL2 | AAL1 | IP over AAL5 | AAL2 | AAL2 |

Table 1 sets forth four basic rules, as follows:

a) If a call enters network 16 using AAL1 over an ATM interface at node 12, the call is carried across network 16 in the same format as it arrives. Any required format conversion is performed at the egress gateway 24.

b) If a call enters network 16 over an IP interface of node 12, the bearer format is converted at the ingress gateway 22 and carried across network 16 as AAL1 if the egress gateway 24 is an AAL1/ATM gateway. The bearer format will be converted at the ingress gateway and carried across the network 16 as IP over AAL5 if the egress gateway 24 is an IP/ATM, TDM/TM, or AAL2/ATM gateway, and any required subsequent format conversion will be performed at the egress gateway.

c) If a call enters network 16 using AAL2 over an ATM interface at node 12, the call will be carried across network 16 as AAL2 if the egress gateway is either an IP/ATM or AAL2/ATM gateway, and any required format conversion is performed at the egress gateway 24. If egress gateway 24 is either an AAL1/ATM or TDM/ATM gateway, the bearer format will be converted at the ingress gateway 22 and carried across network 16 as AAL1.

d) If a call enters network 16 over a TDM interface at node 12, it is carried across network 16 as AAL1 if the egress gateway is either an AAL1/ATM or TDM/ATM gateway, and the TDM to AAL1 format conversion will be performed at the ingress gateway, 22. If egress gateway 24 is an AAL2/ATM gateway, it will be carried across network 16 as AAL2 and the TDM to AAL2 format conversion will be performed at the ingress gateway 22. If egress gateway 24 is an IP gateway, it will be carried across network 16 as IP over AAL5, and the TDM to IP over AAL5 format conversion will be performed a the ingress gateway, 22.

Table 2 identifies bearer format conversion rules to be followed in a network to support these procedures.

TABLE 2

| | Condition | | | | | Operation |
|---|---|---|---|---|---|---|
| If | (ingress interface = AAL1) | AND | (egress interface = AAL1) | then | carry the call as AAL1 to the egress gateway; pass the call unchanged to the terminating node or network |
| | | AND | (egress interface = IP) | then | carry the call as AAL1 to the egress gateway; convert to IP at the egress gateway |
| | | AND | (egress interface = AAL2) | then | carry the call as AAL1 to the egress gateway; convert to AAL2 at the egress gateway |
| | | AND | (egress interface = TDM) | then | carry the call as AAL1 to the egress gateway; convert to TDM at the egress gateway |
| If | (ingress interface = IP) | AND | (egress interface = AAL1) | then | convert the call to AAL1 at the ingress gateway; carry the call as AAL1 to the egress gateway; pass the call unchanged to the terminating node or network |
| | | AND | (egress interface = IP) | then | convert the call to IP over AAL5 at the ingress gateway; carry the call as IP over AAL5 to the egress gateway; pass the call unchanged to the terminating node or network |
| | | AND | (egress interface = AAL2) | then | convert the call to IP over AAL5 at the ingress gateway; carry the call as IP over AAL5 to the egress gateway; convert to AAL2 at the egress gateway |
| | | AND | (egress interface = TDM) | then | convert the call to IP over AAL5 at the ingress gateway; carry the call as IP over AAL5 to the egress gateway; convert to TDM at the egress gateway |
| If | (ingress interface = AAL2) | AND | (egress interface = AAL1) | then | convert the call to AAL1 at the ingress gateway; carry the call as AAL1 to the egress gateway |
| | | AND | (egress interface = IP) | then | carry the call as AAL2 to the egress gateway; convert to IP at the egress gateway |

TABLE 2-continued

| | Condition | | | Operation |
|---|---|---|---|---|
| | AND | (egress interface = AAL2) | then | carry the call as AAL2 to the egress gateway; pass the call unchanged to the terminating node or network |
| | AND | (egress interface = TDM) | then | convert the call to AAL1 at the ingress gateway; carry the call as AAL1 to the egress gateway; convert to TDM at the egress gateway |
| If (ingress interface = TDM) | AND | (egress interface = AAL1) | then | convert the call to AAL1 at the ingress gateway; carry the call as AAL1 to the egress gateway |
| | AND | (egress interface = IP) | then | convert the call to IP over AAL5 at the ingress gateway; carry the call as IP over AAL5 to the egress gateway |
| | AND | (egress interface = AAL2) | then | convert the call to AAL2 at the ingress gateway; carry the call as AAL2 to the egress gateway |
| | AND | (egress interface = TDM) | then | convert the call to AAL1 at the ingress gateway; carry the call as AAL1 to the egress gateway; convert to TDM at the egress gateway |

In order for controllers 26, 28 to exchange the necessary format conversion information, standard messages found in the Bearer Independent Call Control (BICC) signaling protocol may be used. Other signaling protocols, including Session Initiation Protocol (SIP), SIP-T, H.323, PNNI, and B-ISUP, may also be used. The signaling protocol between gateway controllers 26, 28 and the gateways 22, 24, respectively, may include H.248, Media Gateway Control Protocol (MGCP), Trunking Gateway Control Protocol (TGCP), or other protocols. The signaling protocol between gateway controllers 26, 28 and nodes 12, 14, respectively, may include H.248, MGCP, H.323, Q.931, Q.2931, or other protocols. The procedures described here assume that the bearer format used in the backbone network (i.e., bearer format 2 of FIG. 1) is ATM. Similar procedures may also be developed based on different backbone bearer formats, such as IP, TDM, or Frame Relay.

The operation may be described, starting with an exemplary routine executed at an originating node 12. At originating node 12, a call setup message (e.g., an Initial Address Message (IAM)) is sent to gateway controller 26 for the connection between node 12 and ingress gateway 22, similar to the way call setup is initiated for a switch or other conventional call control element. This call setup message may contain a bearer format parameter that provides an indication of bearer format 1. Upon receipt of the call setup message from originating node 12, and based on information contained in said message, controller 26 determines that ingress gateway 22 of network 16 will receive the bearer channel of the call, and that egress gateway controller 28 will control the egress gateway for the call. Controller 26 next attempts to determine the preferred bearer format 2 for transporting the bearer channel across network 16. This may be accomplished according to the following routine:

If (ingress interface = AAL1), then
  send the call setup message to the egress gateway controller, indicating that ATM AAL1 will be used as the bearer format in the backbone network; instruct the ingress gateway to pass the bearer unchanged, as AAL1

-continued

If (ingress interface = IP) then
  send the call setup message to the egress gateway controller, indicating that IP is used as the bearer format on the ingress interface
If (ingress interface = AAL2) then
  send the call setup message to the egress gateway controller, indicating that AAL2 is used as the bearer format on the ingress interface
If (ingress interface = TDM) then
  send the call setup message to the egress gateway controller, indicating that TDM is used as the bearer format on the ingress interface
Upon receipt of the call setup acknowledgement message [e.g., Address Complete Message (ACM)] from the egress gateway controller,
  If (ingress interface = AAL2) then
    If (egress interface = AAL1) then
      instruct the ingress gateway to convert the bearer to AAL1
    If (egress interface = IP) then
      instruct the ingress gateway to keep the bearer as AAL2
    If (egress interface = AAL2) then
      instruct the ingress gateway to keep the bearer as AAL2
    If (egress interface = TDM) then
      instruct the ingress gateway to convert the bearer to AAL1;
  Else if (ingress interface = TDM) then
    If (egress interface = AAL1) then
      instruct the ingress gateway to convert the bearer to AAL1
    If (egress interface = IP) then
      instruct the ingress gateway to convert the bearer to IP over AAL5
    If (egress interface = AAL2) then
      instruct the ingress gateway to convert the bearer to AAL2
    If (egress interface = TDM) then
      instruct the ingress gateway to convert the bearer to AAL1
  Else if (ingress interface = IP) then
    If (egress interface = AAL1) then
      instruct the ingress gateway to convert the bearer to AAL1
    If (egress interface = IP) then
      instruct the ingress gateway to convert the bearer to IP over AAL5
    If (egress interface = AAL2) then
      instruct the ingress gateway to convert the bearer to IP over AAL5
    If (egress interface = TDM) then
      instruct the ingress gateway to convert the bearer to IP over AAL5
  Else if (ingress interface = AAL1) then
    Do nothing
Pass the call setup acknowledgment to the originating node or network.

Upon receipt of a call setup message from ingress gateway controller 26, egress gateway controller 28 determines which egress gateway will receive the bearer channel of the call based on the standard information contained in the call setup message. Thereafter, the call setup message is sent to the terminating node or network, in this case, node 14.

In response to an incoming call setup message from the gateway controller for the egress gateway, terminating node 14 sends an address complete (ACM) message to the gateway controller for the egress gateway, which may include a bearer format parameter indicating bearer format 3.

Upon receipt of the call setup acknowledgment message from the terminating node or network, an operation is performed, which is described in connection with an exemplary routine executed at egress gateway controller 28, as follows:

```
If (egress interface = AAL1), then
    If (ingress interface = AAL1) then
        instruct the egress gateway to pass the bearer unchanged, as AAL1 on
            the egress interface
    If (ingress interface = IP) then
        instruct the egress gateway to convert the bearer channel from AAL1
            to IP on the egress interface
    If (ingress interface = AAL2) then
        instruct the egress gateway to convert the bearer channel from AAL1
            to AAL2 on the egress interface
    If (ingress interface = TDM) then
        instruct the egress gateway to convert the bearer channel from AAL1
            to TDM on the egress interface;
Else if (egress interface = IP) then
    If (ingress interface = AAL1) then
        instruct the egress gateway to convert the bearer channel from AAL1
            to IP on the egress interface
    If (ingress interface = IP) then
        instruct the egress gateway to convert the bearer channel from IP
            over AAL5 to IP on the egress interface
    If (ingress interface = AAL2) then
        instruct the egress gateway to convert the bearer channel from AAL2
            to IP on the egress interface
    If (ingress interface = TDM) then
        instruct the egress gateway to convert the bearer channel from IP
            over AAL5 to IP on the egress interface;
Else if (egress interface = AAL2) then
    If (ingress interface = AAL1) then
        instruct the egress gateway to convert the bearer channel from AAL1
            to AAL2 on the egress interface
    If (ingress interface = IP) then
        instruct the egress gateway to convert the bearer channel from IP
            over AAL5 to AAL2 on the egress interface
    If (ingress interface = AAL2) then
        instruct the egress gateway to pass the bearer unchanged, as AAL2
            on the egress interface
    If (ingress interface = TDM) then
        instruct the egress gateway to pass the bearer unchanged, as AAL2
            on the egress interface;
Else if (egress interface = TDM) then
    If (ingress interface = AAL1) then
        instruct the egress gateway to convert the bearer channel from AAL1
            to TDM on the egress interface
    If (ingress interface = IP) then
        instruct the egress gateway to convert the bearer channel from IP
            over AAL5 to TDM on the egress interface
    If (ingress interface = AAL2) then
        instruct the egress gateway to convert the bearer channel from AAL1
            to TDM on the egress interface
    If (ingress interface = TDM) then
        instruct the egress gateway to convert the bearer channel from AAL1
            to TDM on the egress interface.
```

After the above operation is completed, egress gateway controller 28 sends the call setup acknowledgment message to ingress gateway controller 26, with an indication (in the bearer format parameter) of the type of egress interface used on gateway 24.

Based on the above teachings, the illustrated embodiment described herein may be modified or altered by persons skilled in the art without departing from the scope of the invention, as defined by the appended claims. Thus, it is the intent to include within the scope of the invention all such modifications as may come to the skilled artisan.

We claim:

1. A method of providing format conversion between an originating node and a terminating node, the method comprising:
    transferring between controllers residing within a network associated with the originating and terminating nodes signaling information indicative of first and second format control parameters respectively associated with the originating and terminating nodes, wherein said originating and terminating nodes are external to the network;
    in response to the first format control parameter, converting a first bearer format to a format compatible with the network to enable the originating node to communicate with the network if said first bearer format is incompatible with a network protocol of the network; and
    in response to the second format control parameter, converting the network protocol to a protocol compatible with a second bearer format to enable the terminating node to communicate with the network if said second bearer format is incompatible with the network protocol of the network.

2. The method as recited in claim 1, further comprising:
    in said transferring step, transferring said signaling information on a call-by-call basis.

3. The method as recited in claim 1, further comprising:
    in said transferring step, transferring said signaling information on an intermittent basis and storing said first and second format control parameters in respective memories of said controllers.

4. The method as recited in claim 3, wherein said transferring occurs periodically.

5. The method as recited in claim 1, wherein said transferring step includes broadcasting the signaling information by the controller of the originating node to other controllers of the network thereby to propagate the signaling information throughout the network.

6. In a communication network, a method of providing format conversion between an originating node and a terminating node having respective associated node-to-network gateways wherein bearer information is transmitted to the network from the originating node according to a first bearer format and bearer information is received from the network by the termination node, the method comprising:
    transferring between controllers residing within the network associated with the originating and terminating nodes a format conversion parameter indicative of a conversion required to enable communication between one of the nodes and the network, wherein said originating and terminating nodes are external to the network; and
    in response to the format conversion parameter, performing at least one of converting bearer information transmitted to the network by the originating node to a format compatible with the network and converting bearer information received from the network by the terminating node to a format compatible with the terminating node.

7. The method as recited in claim 6, further comprising:
    in said transferring step, transferring the format conversion parameter on a call-by-call basis.

8. The method as recited in claim 6, further comprising:
in said transferring step, transferring the format conversion parameter on an intermittent basis and storing said format conversion parameter in respective memories of said controllers.

9. The method as recited in claim 8, wherein said transferring occurs periodically.

10. The method as recited in claim 6, wherein said transferring step includes broadcasting the format conversion parameter by the controller of the originating node to other controllers of the network thereby to propagate the format conversion parameter throughout the network.

* * * * *